US010834769B2

(12) United States Patent
Sivakumar et al.

(10) Patent No.: US 10,834,769 B2
(45) Date of Patent: *Nov. 10, 2020

(54) METHODS AND SYSTEMS FOR IMPROVING DEVICE-TO-DEVICE COMMUNICATIONS IN A WIRELESS NETWORK

(71) Applicant: INTERNATIONAL BUSINESS MACHINES CORPORATION, Armonk, NY (US)

(72) Inventors: Gandhi Sivakumar, Bentleigh (AU); Sandeep R. Patil, Pune (IN); Sasikanth Eda, Vijayawada (IN); Abhishek Jain, Baraut (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,794

(22) Filed: Jul. 3, 2019

(65) Prior Publication Data

US 2019/0327777 A1   Oct. 24, 2019

Related U.S. Application Data

(63) Continuation of application No. 15/825,203, filed on Nov. 29, 2017, now Pat. No. 10,390,381.

(51) Int. Cl.
*H04W 76/14* (2018.01)
*H04W 24/10* (2009.01)
(Continued)

(52) U.S. Cl.
CPC .......... *H04W 76/14* (2018.02); *H04W 4/029* (2018.02); *H04W 8/005* (2013.01); *H04W 24/08* (2013.01);
(Continued)

(58) Field of Classification Search
CPC .......... H04B 17/00; H04B 3/46; H04L 43/00; H04L 43/50; H04W 24/00; H04W 76/14;
(Continued)

(56) References Cited

U.S. PATENT DOCUMENTS 9,240,818 B2 * 1/2016 Solondz ................. H04B 15/00
9,813,845 B2 * 11/2017 Kim ......................... H04W 4/80
(Continued)

FOREIGN PATENT DOCUMENTS

WO   2017026970 A1   2/2017

OTHER PUBLICATIONS

List of IBM Patents or Patent Applications Treated as Related (2 pages).
(Continued)

*Primary Examiner* — Sharad Rampuria
(74) *Attorney, Agent, or Firm* — Griffiths & Seaton PLLC

(57) ABSTRACT

Embodiments for managing a wireless communication network by one or more processors are described. The presence of a plurality of mobile electronic devices within a wireless communication network is detected. A device-to-device (D2D) connectability score for each of the plurality of mobile electronic devices is calculated. The calculating of the D2D connectability score for each of the plurality of mobile electronic devices is based on a security posture of the respective mobile electronic device, a privacy posture of the respective mobile electronic device, or a combination thereof. A signal representative of the calculated D2D connectability score for each of the plurality of mobile electronic devices is generated.

18 Claims, 10 Drawing Sheets

(51) Int. Cl.
*H04W 8/00* (2009.01)
*H04W 4/029* (2018.01)
*H04W 24/08* (2009.01)
*H04W 28/04* (2009.01)
*H04W 4/70* (2018.01)

(52) U.S. Cl.
CPC .............. *H04W 24/10* (2013.01); *H04W 4/70* (2018.02); *H04W 28/04* (2013.01)

(58) Field of Classification Search
CPC ..... H04W 4/029; H04W 24/10; H04W 8/005; H04W 4/70; H04W 28/04
See application file for complete search history.

(56) References Cited

U.S. PATENT DOCUMENTS

| 9,841,935 | B2 | 12/2017 | Chang et al. | |
|---|---|---|---|---|
| 9,888,508 | B2* | 2/2018 | Khoryaev | ............. H04W 76/14 |
| 2016/0135239 | A1* | 5/2016 | Khoryaev | ............. H04W 72/04 370/329 |
| 2017/0126338 | A1 | 5/2017 | Zaidi et al. | |

OTHER PUBLICATIONS

Gandotra et al., "A survey on device-to-device (D2D) communication: Architecture and security issues," Journal of Network and Computer Applications 78, Nov. 12, 2016 (21 pages).

\* cited by examiner

METHODS AND SYSTEMS FOR IMPROVING DEVICE-TO-DEVICE COMMUNICATIONS IN A WIRELESS NETWORK

CROSS-REFERENCE TO RELATED APPLICATIONS

This Application is a Continuation of U.S. patent application Ser. No. 15/825,203 filed Nov. 29, 2017.

BACKGROUND OF THE INVENTION

Field of the Invention

The present invention relates in general to computing systems, and more particularly, to various embodiments for improving device-to-device (D2D) communications in wireless communication networks.

Description of the Related Art

In the first four generations of cellular networks (i.e., 1G, 2G, 3G, and 4G), device-to-device (D2D) communication functionality, for the most part, has not been seriously considered. In part, this is because D2D communication has mainly been envisioned as a tool to reduce the cost of local service provisions, which has been relatively insignificant based on cellular carriers' market statistics.

However, D2D communication may be implemented in the next generation of networks (i.e., 5G), along with, for example, a higher density of mobile broadband users, improved reliability, massive machine communications, lower latency, and reduced battery consumption.

SUMMARY OF THE INVENTION

Various embodiments for managing a wireless communication network by one or more processors are described. In one embodiment, by way of example only, a method for managing a wireless communication network, again by one or more processors, is provided. The presence of a plurality of mobile electronic devices within a wireless communication network is detected. A device-to-device (D2D) connectability score for each of the plurality of mobile electronic devices is calculated. The calculating of the D2D connectability score for each of the plurality of mobile electronic devices is based on a security posture of the respective mobile electronic device, a privacy posture of the respective mobile electronic device, or a combination thereof. A signal representative of the calculated D2D connectability score for each of the plurality of mobile electronic devices is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
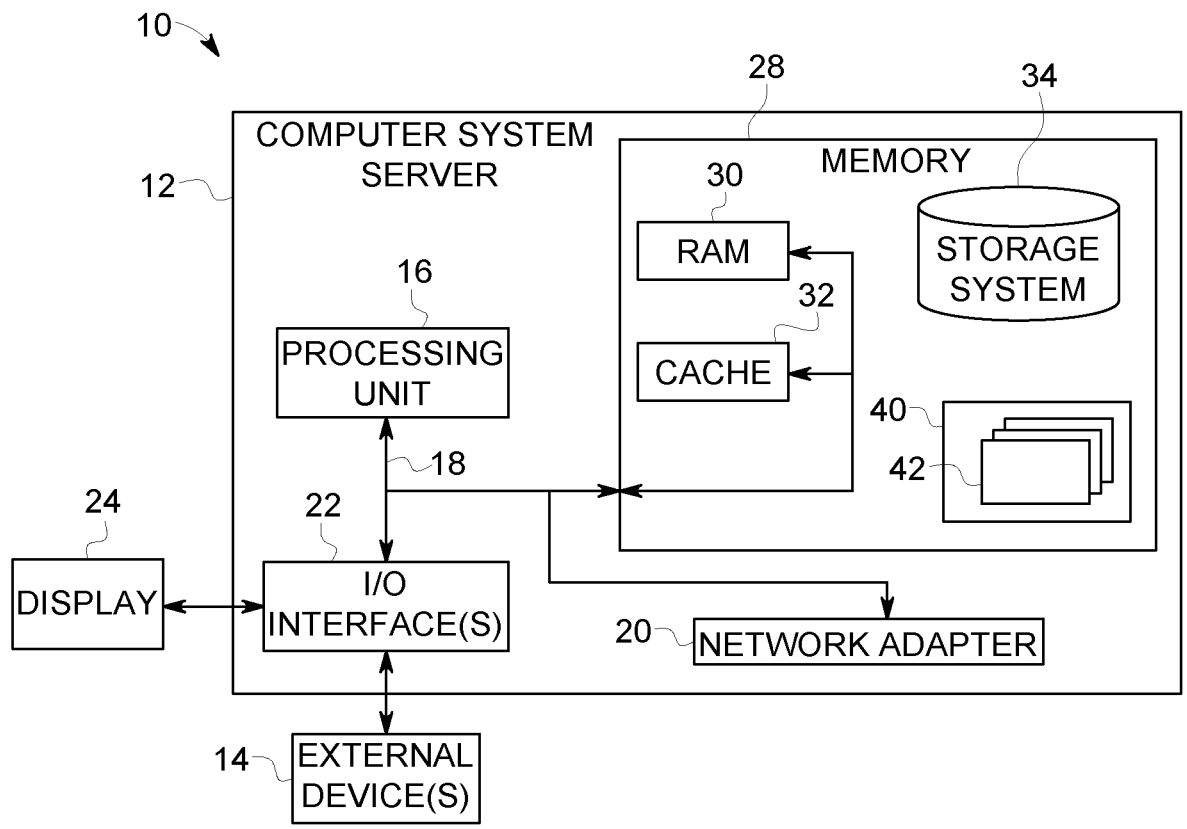
FIG. 1 is a block diagram depicting an exemplary computing node according to an embodiment of the present invention.

As discussed above, in the first four generations of cellular networks (i.e., 1G, 2G, 3G, and 4G), device-to-device (D2D) communication functionality, for the most part, has not been seriously considered. In part, this is because D2D communication has mainly been envisioned as a tool to reduce the cost of local service provisions, which has been relatively insignificant based on cellular carriers' market statistics. However, D2D communication may be implemented in the next generation of networks (i.e., 5G), along with, for example, a higher density of mobile broadband users, improved reliability, massive machine communications, lower latency, and reduced battery consumption.

The following discussion describes various features and defines various terms associated with such storage environments, which may be helpful in understanding the embodiments described herein.

A "two-tier cellular network" involves a microcell tier (e.g., base station-to-device communications) and a device tier (e.g., device-to-device communications). Device terminal relaying makes it possible for devices in a network to function as transmission relays for each other and realize a massive ad hoc mesh network.

One possible approach for D2D communication involves device relaying with operator controlled link establishment (DR-OC). For example, in such an implementation, a device (e.g., a mobile phone) at the edge of a cell or in a poor coverage area may be able to communicate with a base station (BS) through relaying its information through other devices (e.g., other mobile phones). This would allow for the device to achieve, for example, a higher quality of service and/or improved battery life. The operator communicates with the relaying devices for partial or full control link establishment.

Another approach involves direct D2D communication with operator controlled link establishment (DC-OC). For example, in such an implementation, the source and destination devices may be able to exchange data with each other without the need for a base station, but they are assisted by the operator for link establishment.

As another example, device relaying with device controlled link establishment (DR-DC) may be used. For example, in such an implementation, the operator may not be involved in the process of link establishment. Rather, the source and destination devices are responsible for coordinating communication using relays between each other.

A further approach involves direct D2D communication with device controlled link establishment (DC-DC). For example, in such an implementation, the source and destination devices have direct communication with each other without any operator control. Therefore, the source and destination devices should use the resource in such a way as to ensure limited interference with other devices in the same tier and the macrocell tier.

Cognitive radio (CR) is a form of wireless communication in which a transceiver may intelligently detect which communication channels are in use and which are not, and instantly move into vacant channels while avoiding occupied ones. This may optimize the use of the available radio-frequency (RF) spectrum while minimizing interference to other users. In its most basic form, cognitive radio is a hybrid technology involving software defined radio (SDR) as applied to spread spectrum communications. Possible functions of cognitive radio include the ability of a transceiver to determine its geographic location, identify and authorize its user, encrypt or decrypt signals, sense neighboring wireless devices in operation, and adjust output power and modulation characteristics.

In recent years, carriers' attitudes regarding D2D functionality has started to change because of several trends in the wireless market. For example, the number of context-aware services and applications is growing rapidly. These applications often require location discovery and communication with neighboring devices. D2D functionality would most likely reduce the costs of communication among devices.

D2D functionality may also play an important role in mobile cloud computing and facilitate effective sharing of resources (e.g., spectrum, computational power, applications, social contents, etc.) for users in close proximity to each other. Service providers may also be able to take advantage of D2D functionality in order to reduce the network traffic in a local area such as a stadium or a big mall by allowing direct transmission among cell phones and other devices. Furthermore, D2D communication may be of critical use in emergency situations, such as natural disasters. For example, in the event of an earthquake or hurricane, an urgent communication network may be able to be quickly set up using D2D functionality, replacing the damaged communication network and Internet infrastructure.

However, current D2D communication implementations are designed (or getting framed) in manner to reduce the number of manual interventions required to establish communication across the peer devices and/or enhance the automated handshake between the peer devices. Typically, various other considerations are not taken into account when establishing D2D communication between a specific pair of devices among various device sets. For example, no consideration is given with respect to providing a framework that helps improve or ensure security and quality of service participating in D2D communication.

To address these needs, some embodiments described herein provide methods and systems for managing one or more wireless communication networks in such a way as to improve and/or ensure security, privacy, and quality of service of D2D communications. For example, in some embodiments, a D2D "connectability score" for at least some mobile electronic devices is calculated. The D2D connectability score may provide an indication of the security, privacy, and overall quality of service that may be possible when participating in D2D communications utilizing that particular device. Based on the D2D connectability scores (or just "connectability scores"), one or more mobile devices is selected. D2D communications may then be established utilizing the selected device(s).

In particular, in some embodiments, a method for managing a wireless communication network by one of more processors is provided. The presence of a plurality of mobile electronic devices within a wireless communication network is detected. A device-to-device (D2D) connectability score for each of the plurality of mobile electronic devices is calculated. A signal representative of the calculated D2D connectability score for each of the plurality of mobile electronic devices is generated.

The signal may be transmitted at least one of to a base station within the wireless communication network or from a respective one of the plurality of mobile devices to another mobile electronic device. D2D communications may be established between another mobile electronic device and a selected one of the plurality of mobile electronic devices based on the calculated D2D connectability score of each of the plurality of mobile electronic devices.

The calculating of the D2D connectability score for each of the plurality of mobile electronic devices may be based on a security posture of the respective mobile electronic device, a privacy posture of the respective mobile electronic device, or a combination thereof. The calculating of the D2D connectability score for each of the plurality of mobile electronic devices may be based on a cost associated with utilizing the respective mobile electronic device in D2D communications.

The calculating of the D2D connectability score for each of the plurality of mobile electronic devices may be based on previously recorded data with respect to quality associated with the respective mobile electronic device. The calculating of the D2D connectability score for each of the plurality of mobile electronic devices may be based on a determination of the software installed on the respective mobile electronic device. The calculating of the D2D connectability score for each of the plurality of mobile electronic devices may be based on predicted movements of the respective mobile electronic device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, mobile electronic devices, such as mobile (or cellular or smart) phones, PDAs, tablets, laptop devices, other computing devices, such as personal computer systems and network PCs/servers, and/or various other devices, such as cellular network base stations. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
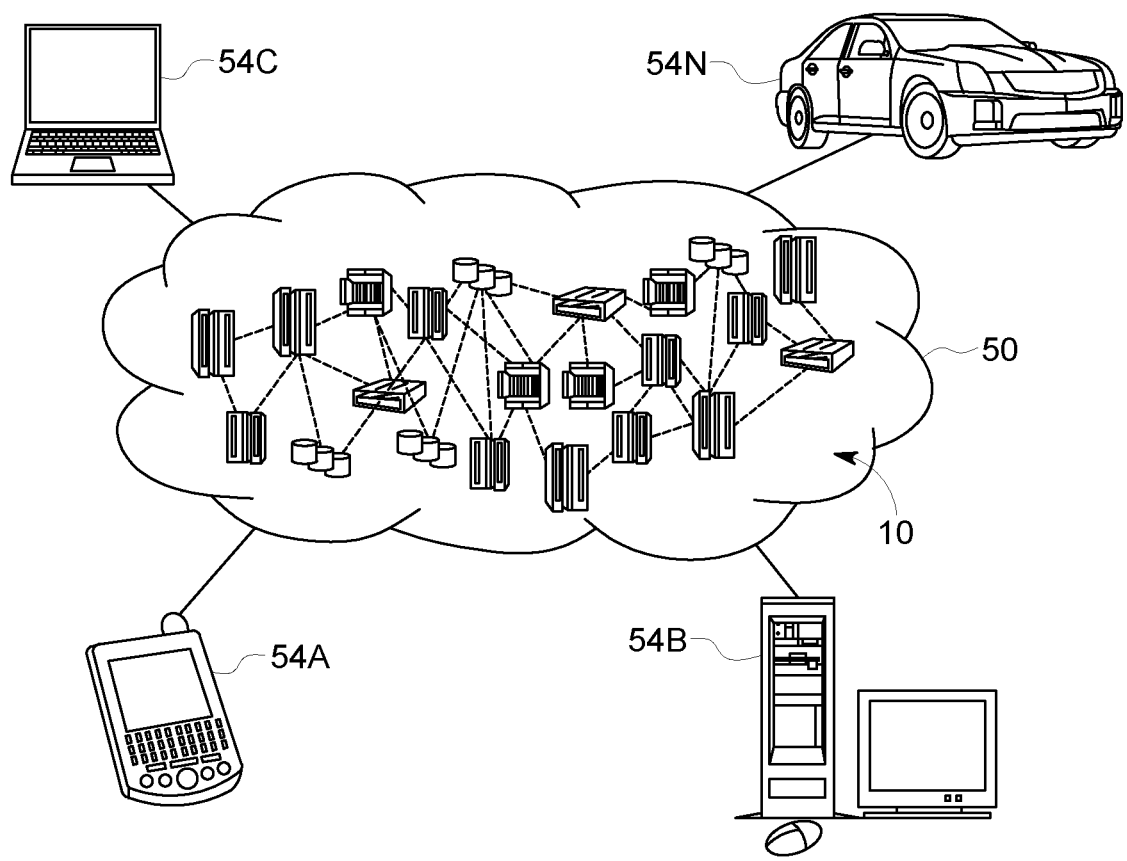
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
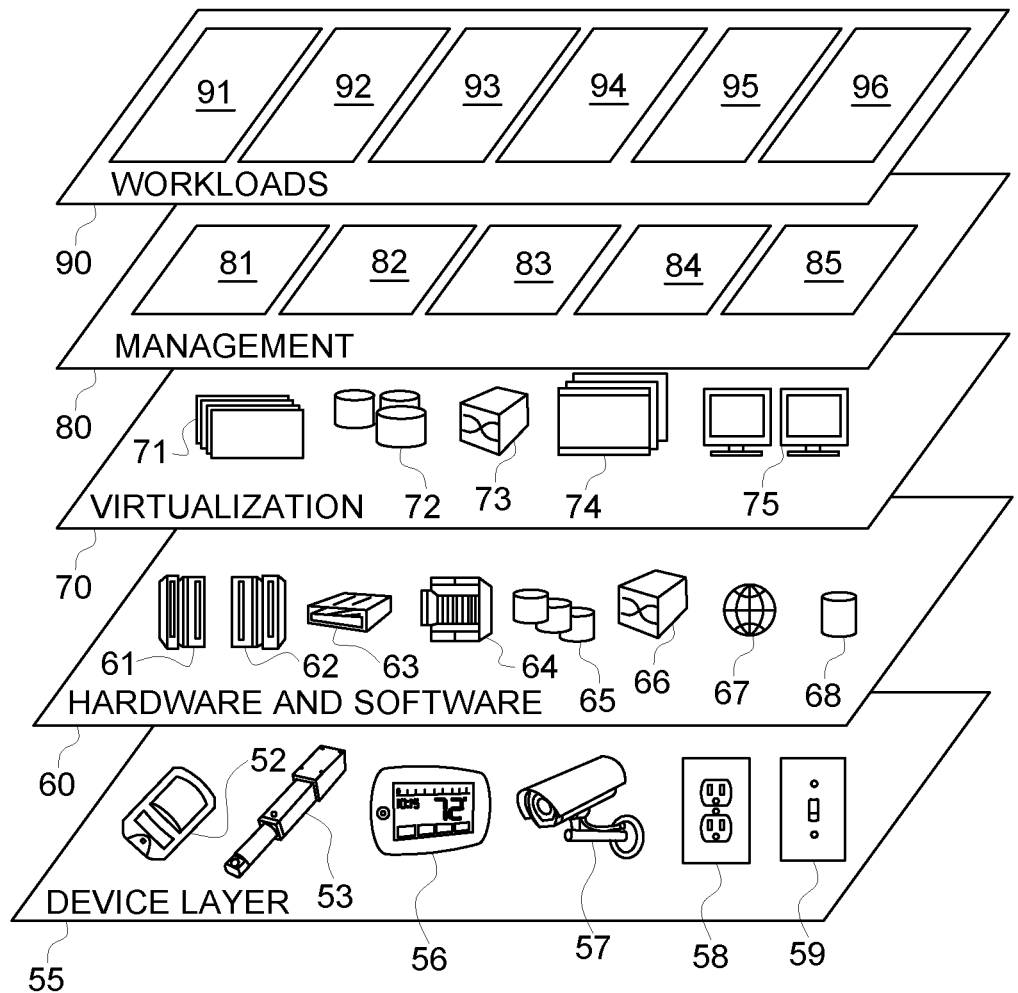
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing wireless communication networks as described herein. One of ordinary skill in the art will appreciate that the workloads and functions 96 for managing wireless communication networks may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
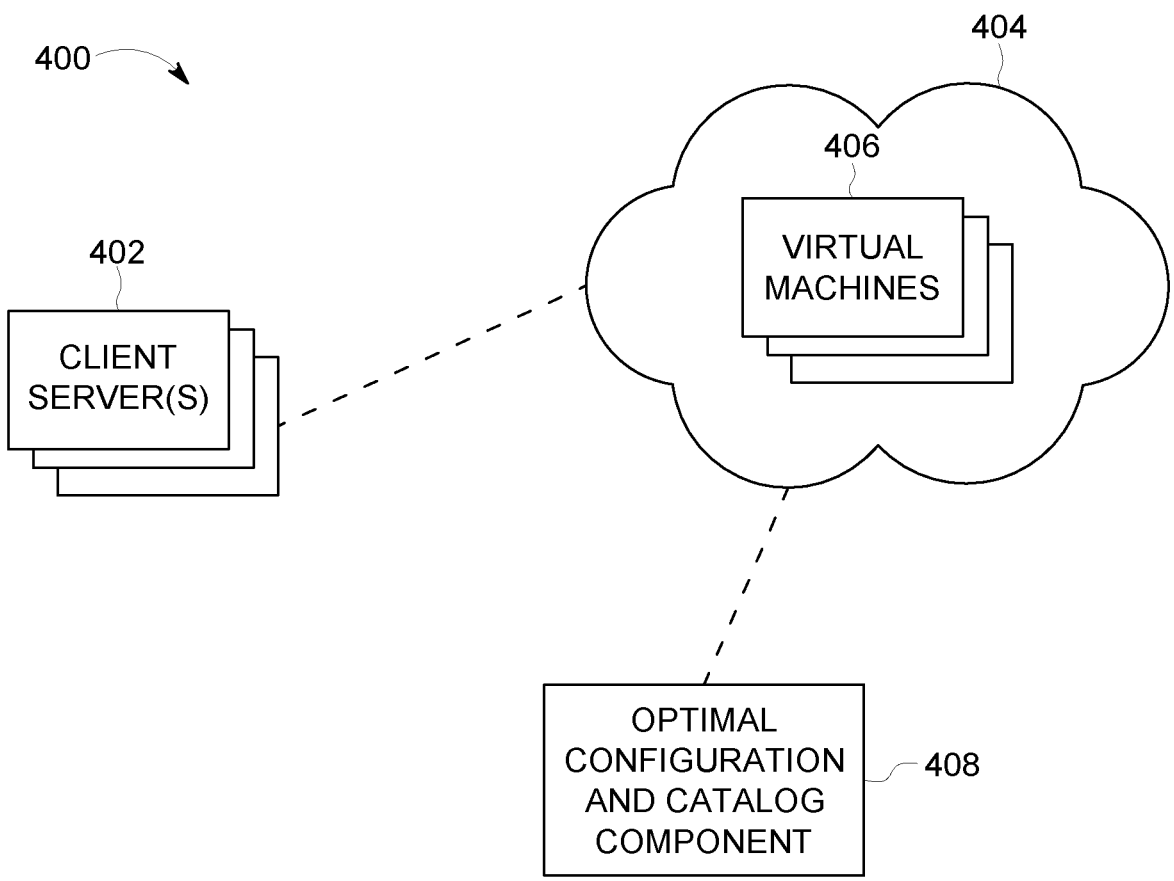
FIG. 4 is a block diagram example computing environment according to an embodiment of the present invention.

FIG. 4 shows an overview of an example environment in accordance with aspects of the present invention. As shown in FIG. 4, environment 400 may include client servers 402, a cloud provider network 404, virtual machines 406, and an optimal configuration and catalog component 408.

The client servers 402 may include computing devices associated with users that access the cloud provider network 404 for cloud services. The client servers 402 may implement any number or type of application, and may request virtual resources provided by one or more virtual machines 406 implemented as part of the cloud provider network 404. Each client server 402 may be associated with a service level agreement (SLA) that defines the configuration for a virtual machine (VM) owned by the user of the client server 402. For example, the configuration may identify the resources provided the VM, the types of applications supported by the VM, and/or other specifications relating to the VM.

The cloud provider network 404 may include network nodes, such as network nodes 10 of FIG. 2. Additionally, or alternatively, the cloud provider network 404 may include one or more wired and/or wireless networks. For example, the cloud provider network 404 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network, including combinations thereof, along with any suitable infrastructure. Additionally, or alternatively, the cloud provider network 404 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The cloud provider network 404 may implement one or more virtual machines 406 across its network. Each virtual machine 406 may host one or more virtual images for use by the client servers 402. In some embodiments, the client servers 402 may access virtual resources provided by the virtual machines 406. One or more physical servers or computing devices within the cloud provider network 404 may host one or more virtual machines 406.

The optimal configuration and catalog component 408 may include one or more computing devices that may store information regarding VM configurations (e.g., the resources provided by VMs for each user or each client server 402), monitor the performance and activity of the VMs post-deployment, and periodically compute and determine the optimal configurations for future VMs based on the performance and activity of deployed VMs. The optimal configuration and catalog component 408 may periodically determine optimal VM configurations for future VM deployments based on the historical performance and activity of currently deployed VMs. The deployment of optimal VM configurations may reduce the number of VM redeployments, thereby reducing costs and resource fragmentation. In embodiments, the optimal configuration and catalog component 408 may pre-deploy VMs by storing images of pre-deployed VMs so that these VMs do not need to be built from scratch, thereby saving time in the deployment (or redeployment) of new VMs to users.

In alternative embodiments, the optimal configuration and catalog component 408 may monitor the modification of VMs post-deployment, determine scripts/techniques used to implement the modifications, generate or update automated actions to automate modifications that are routinely performed, and store the automated actions in a catalog for use by administrators.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

As previously mentioned, the methods and systems of the illustrated embodiments provide novel approaches for managing wireless communication networks, such as two-tier cellular networks (e.g., 5G cellular networks). In some embodiments, a D2D connectability score is determined for each of a plurality of mobile electronic devices (or mobile devices), such as cellular phones, tablets, etc. The D2D connectability score may provide an indication of the security, privacy, and/or overall service quality that may be achieved when utilizing the respective mobile device in D2D communications.

Figure 5:
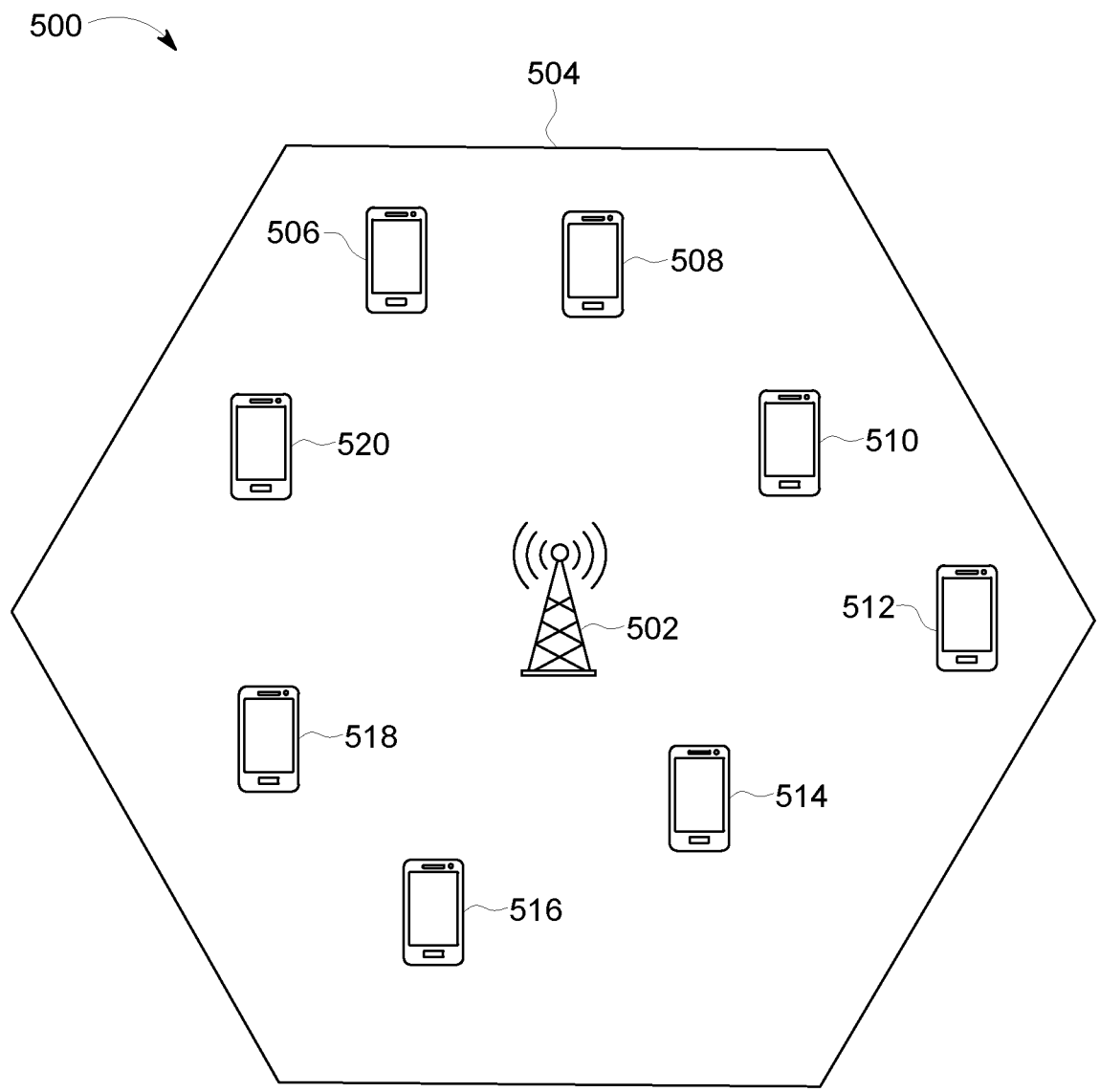
FIG. 5 is a simplified diagram of a wireless communication network having multiple mobile devices present therein according to an embodiment of the present invention.

FIG. 5 is a simplified diagram of a wireless communication network 500 (or a portion thereof) according to some embodiments of the present invention. In some embodiments, the wireless communication network 500 is a two-tier cellular network, such as a 5G cellular network. The network 500, in the simplified form shown, includes a base station 502 and a cell (or range) 504 corresponding to the base station 502. As shown, mobile devices (e.g., cellular phones) 506-520 are present (or have been detected) within (or at least near) the cell 504. In the example shown, it may be assumed that mobile device 506 is in need of (and/or is requesting, is about to request, is preparing to request, etc.) D2D communications with another mobile device.

In some embodiments, a D2D connectability score is determined for each of the other mobile device 508-520 (and perhaps mobile device 506 as well). In particular, in some embodiments, a D2D connectability score is determined (at least) for those of the mobile devices 506-520 that are detected as being enabled for D2D communication (e.g., via user preferences, system setting, etc.).

In some embodiments, the D2D connectability score for each of the mobile devices 506-520 is based on multiple factors (or features, parameters, characteristics, etc.) that may provide an indication of the possible security, privacy, and/or overall quality of D2D communications utilizing the respective device. In some embodiments, the factors are weighted such that some of the factors influence the overall D2D connectability score more than others.

In one particular embodiment, the factors used to determine the D2D connectability score include the following, listed in descending weight (or importance) order: the cost/rates for using a channel (e.g., voice, video, data, etc.) associated with the mobile device (and/or the carrier administering the mobile device); whether or not the cost/rates vary depending on the type of service utilized (e.g., data vs. video); whether or not the cost/rates vary depending on urgency/need of connectivity (e.g., emergency situation requiring immediate routing vs. general purpose communication); base station or carrier charges incurred for switching tiers (e.g., charges levied by carrier on switching D2D to base station); whether or not it is a relatively "good time" or "bad time" to route traffic to the particular carrier and/or connection quality of carrier (e.g., number of dropped calls, freeze in video, data transmission quality, etc., which may be based on input received from user feedback and device observations); software installed (e.g., business applications, etc.) on the mobile device; security and/or privacy maturity metric, posture, etc. of the mobile device and/or the user; enablement of a secure channel and/or protocol; operating system status (e.g., regarding updates, patches, etc.) and storage capacity (e.g., of the mobile device); estimated/predicted position, movement, speed, and/or availability of the mobile device and/or the user (e.g., based on previous observations, schedules, etc.); current battery status (e.g., charge) and mobile conditions (e.g., distance to nearest charge station).

The D2D connectability score determined using such factors may be a numerical score, on any suitable scale. In some embodiments, the mobile device determined to have the highest D2D connectability score is selected for D2D communication. However, the scale and/or weighting of the factors may be reversed so that a lower D2D connectability score is considered more desirable than a higher D2D connectability score. Also, it should be understood that the factors described above are intended only as an example, as other factors (and/or a different set of factors) may be utilized in other embodiments, which if weighted as described above, may be weighted in any suitable order.

In some embodiments, after the D2D connectability scores are calculated, the scores are transmitted (or broadcast) to the base station 502 (e.g., in the case of DR-OC) and/or all CR devices (e.g., in case of DC-OC, DC-DC, or DR-DC). Additional factors may be utilized to further narrow the selection of mobile devices for D2D communications (i.e., to adjust the D2D communication score(s)). For example, whether or not the other mobile device (and/or user) has any previous association with the mobile device requesting D2D communications may also be considered. That is, if the user associated with the other mobile device is listed as a "contact" (e.g., a friend, family member, business associate, etc.) of the user of the requesting mobile device, that particular device may be given higher priority (and/or the D2D connectability score determined for that mobile device may be increased). Similarly, if the other mobile device has previously been contacted by the requesting mobile device (e.g., for direct communication and/or previous D2D communications), such mobile devices may be given higher priority.

In some embodiments, the duration and type of the D2D communication session (e.g., call, data transmission, etc.) is predicted (e.g., the source CR may be enhanced to estimate the duration of the call, etc. based on the context identified from the call). In some embodiments, a peer (or known) device (if possible) is then selected with the highest (or "best") D2D connectability score to establish D2D communication.

Figure 6:
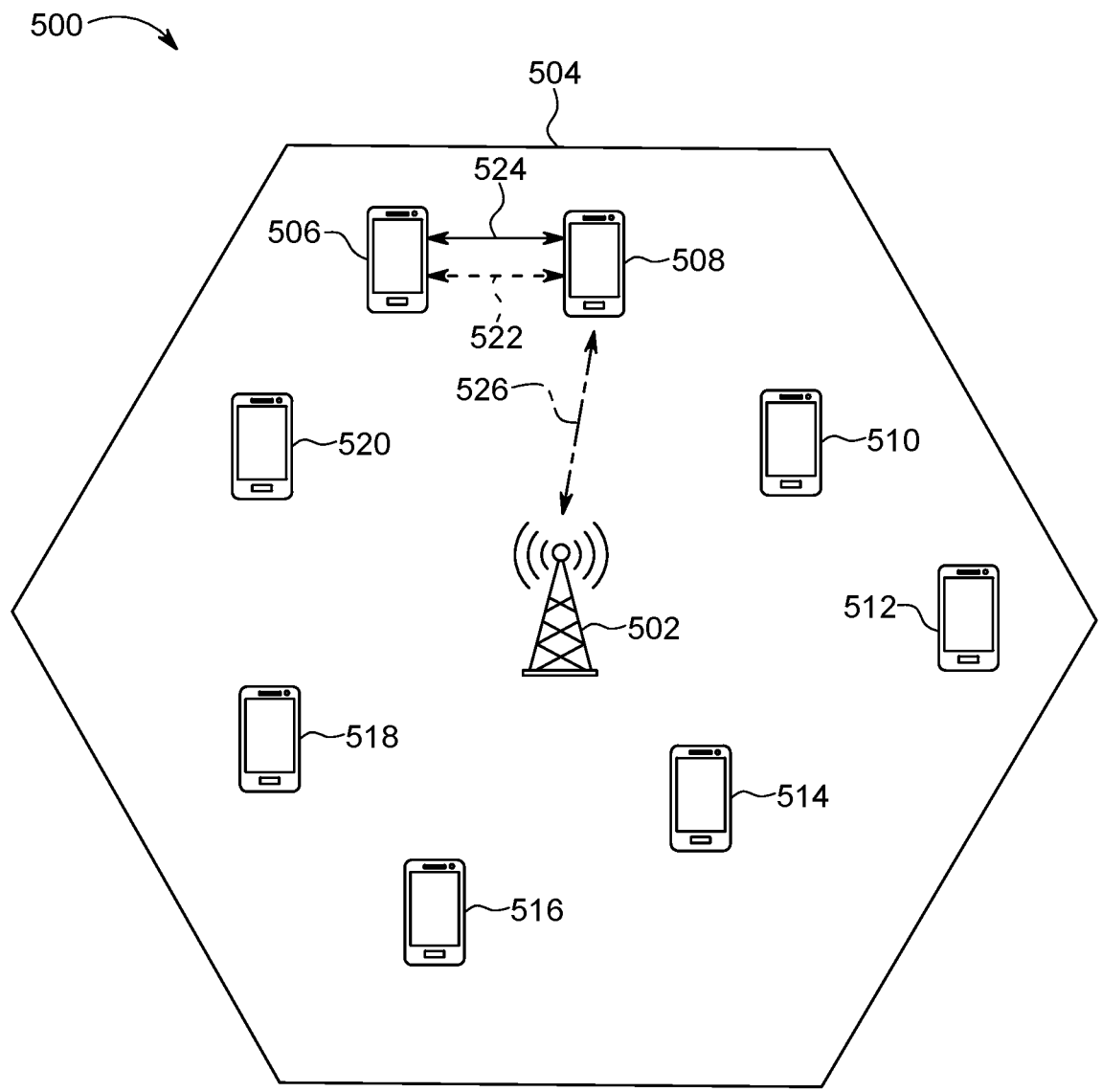
FIG. 6 is a simplified diagram of the wireless communication network of FIG. 5 after D2D communications have been established between two of the mobile devices according to an embodiment of the present invention.

Referring now to FIG. 6, in the embodiment shown, mobile device 508 has been selected to be utilized in D2D communication with mobile device 506. As such, as shown, a control link (or signal) 522 has been established between mobile device 506 and mobile device 508, and mobile device 506 and 508 are transmitting a D2D communication signal 524 therebetween. A routing signal 526 has been established between mobile device 508 and the base station 502, as the mobile device 508 serves as a relay between mobile device 506 and the base station 502, as is commonly understood.

Figure 7:
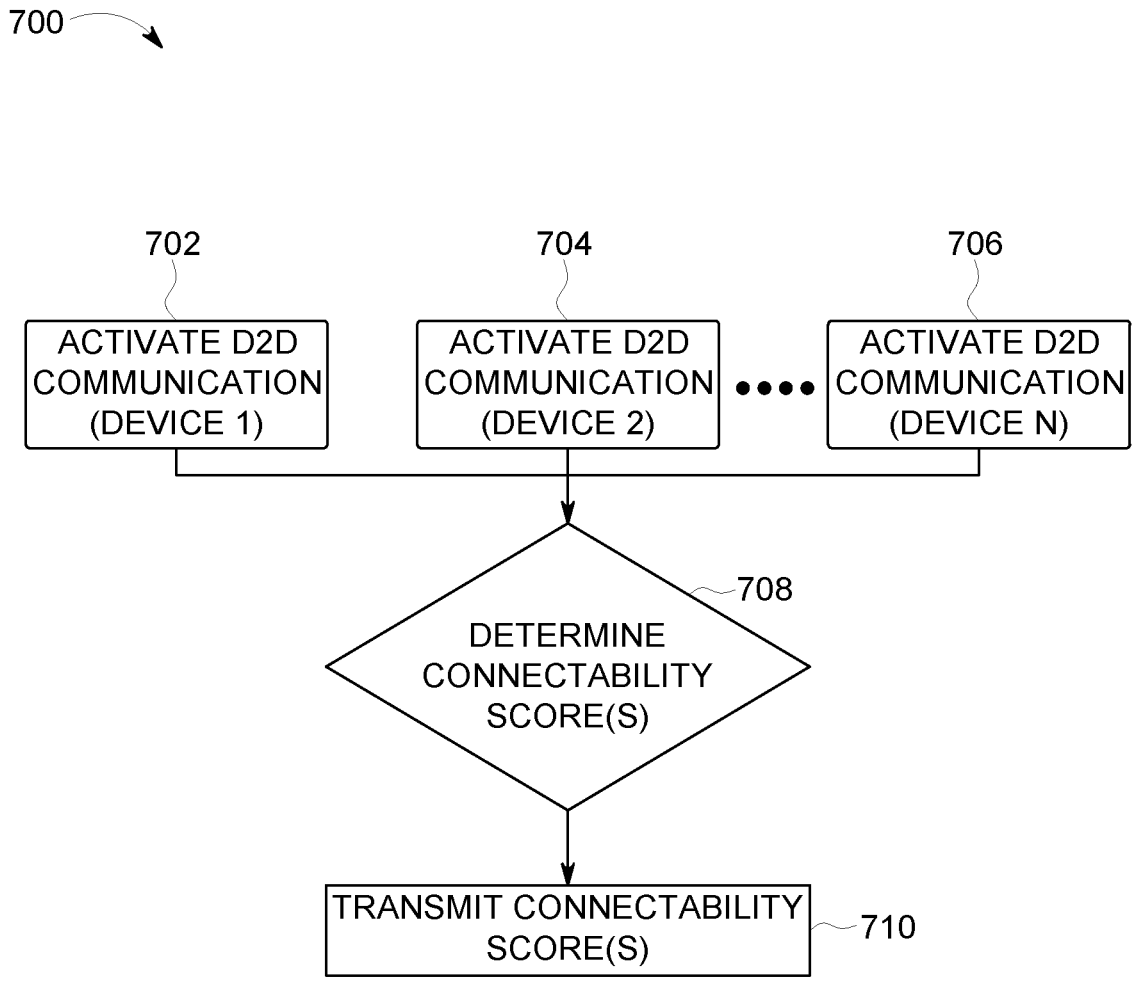
FIG. 7 is a flowchart diagram of an exemplary method for managing a wireless communication network according to an embodiment of the present invention.

FIG. 7 illustrates a flowchart diagram of a method (and/or system) 700 for managing a wireless communication network in accordance with various aspects of the present invention. At blocks 702, 704, and 706, the presence of multiple mobile electronic devices is detected and/or D2D communication is activated in multiple, detected mobile devices. Although the detection of three mobile devices (or the activation of D2D communication within three mobile devices) is shown in FIG. 7, it should be understood that in other embodiments a different number of mobile devices may be present/detected (i.e., "device N"). At block 708, the D2D connectability score for each of the mobile devices is determined or calculated, as described above. At block 710, the D2D connectability scores are transmitted (e.g., to a base station and/or shared/broadcasted among the various mobile devices).

Figure 8:
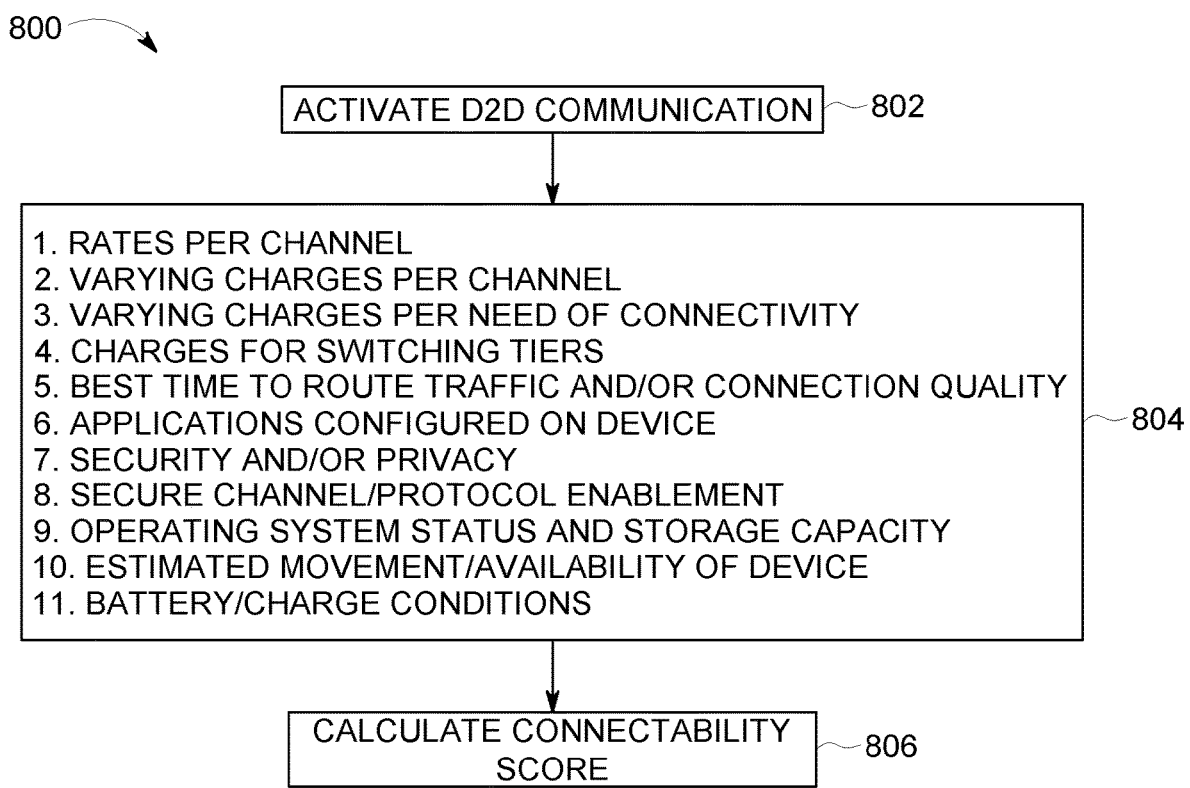
FIG. 8 is a flowchart diagram of an exemplary method for managing a wireless communication network according to an embodiment of the present invention.

FIG. 8 illustrates a flowchart diagram of a method (and/or system) 800 for managing a wireless communication network in accordance with various aspects of the present invention. At block 802, D2D communication capability is activated within a mobile device (and/or the presence of a mobile device with D2D communication enabled is detected).

At block 804, information related to various factors or characteristics of the mobile device, the user thereof, and/or the carrier administering the mobile device are collected. In the particular embodiment shown, the factors include costs/rates per channel, varying charges per channel, varying charges per need of connectivity, charges/costs for switching tiers, best time to route traffic and/or connection quality, application installed (or configured) on mobile device, security and/or privacy posture, secure channel/protocol enablement, operating system status/storage capacity of device, estimated movement/availability, and battery/charge conditions. As described above, it should be understood that the list of factors shown in block 804 is merely intended to provide an example of a list of factors that may be used in determining the D2D connectability score, and in other embodiments, different factors may be utilized. At block 806, a D2D connectability score is calculated using the information collected at block 804, as described above.

Figure 9:
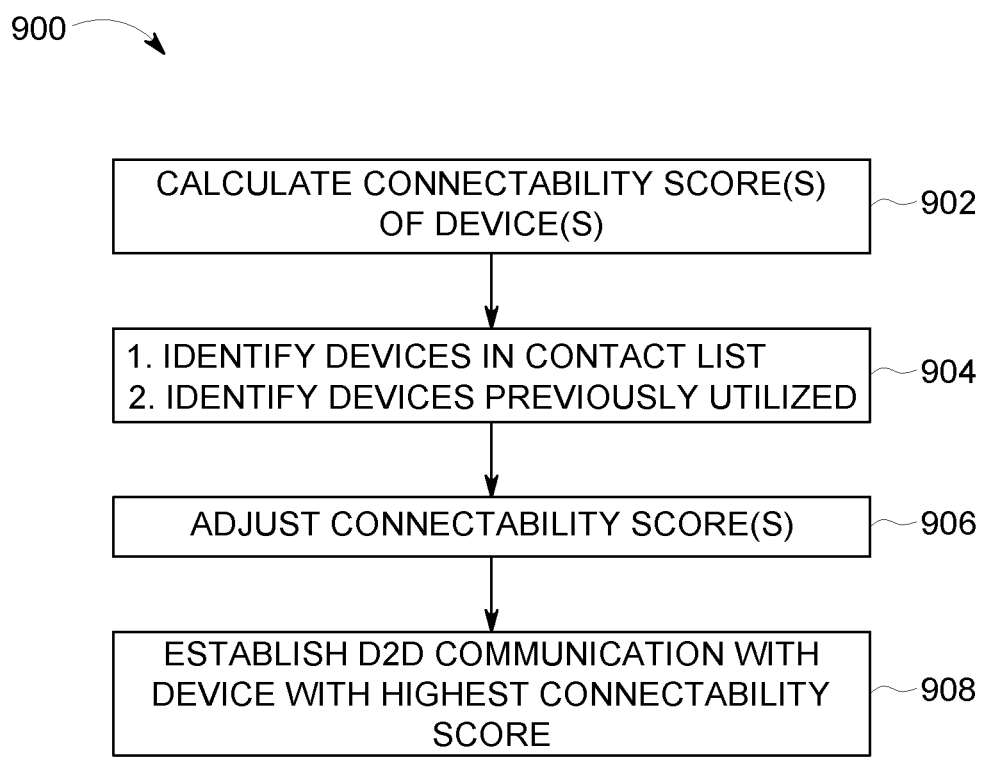
FIG. 9 is a flowchart diagram of an exemplary method for managing a wireless communication network according to an embodiment of the present invention.

FIG. 9 illustrates a flowchart diagram of a method (and/or system) 900 for managing a wireless communication network in accordance with various aspects of the present invention. At block 902, after D2D communication capability is activated within mobile devices and/or the presence of mobile devices with D2D communication enabled is detected, a D2D connectability score for each of the mobile devices is calculated, as described above.

At block 904, information related to any previous association between the mobile devices and another mobile device (e.g., the mobile device requesting D2D communication) is collected. In the example shown, the information includes whether or not the user associated with each mobile device is a contact of the user of the requesting mobile device and whether or not each mobile device has previously been used in communication with the requesting mobile device (e.g., direct communication, D2D communication, etc.). At block 906, the calculated D2D connectability score for each of the mobile devices is adjusted based on the information collected at block 904 (i.e., if appropriate). At block 908, D2D communication is established with the mobile device with the highest D2D connectability score (i.e., between the "best" candidate among the mobile devices and the requesting mobile device).

Figure 10:
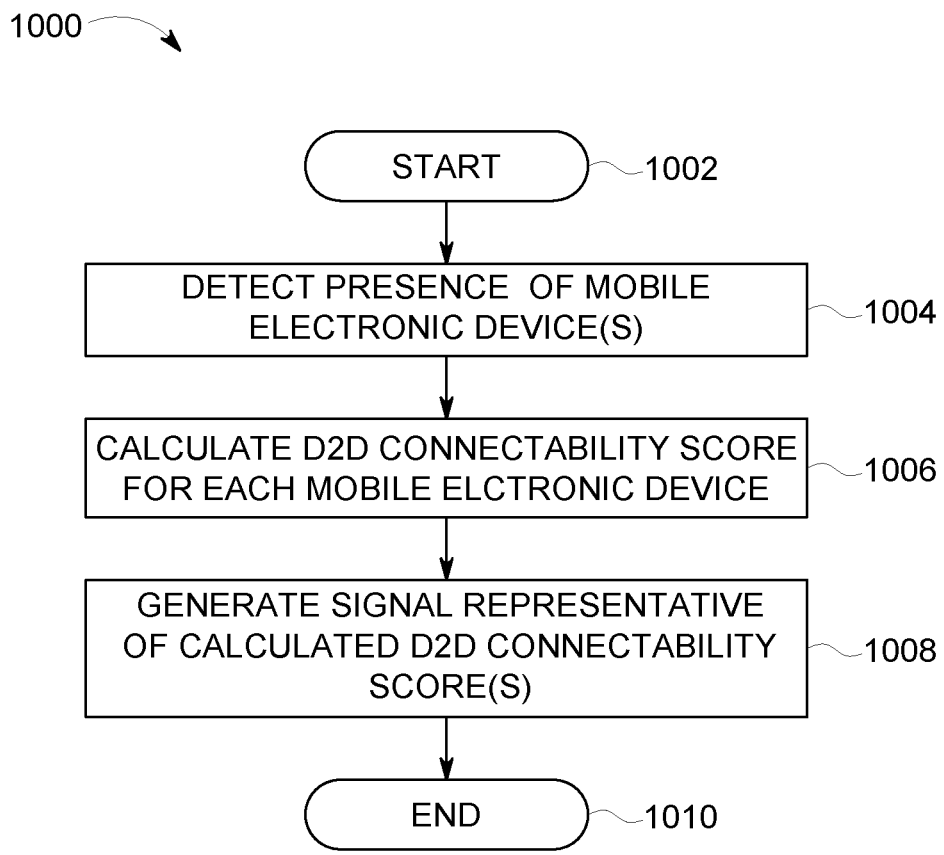
FIG. 10 is a flowchart diagram of an exemplary method for managing a wireless communication network according to an embodiment of the present invention.

Turning to FIG. 10, a flowchart diagram of an exemplary method 1000 for managing a wireless communication network, in accordance with various aspects of the present invention, is provided. Method 1000 begins (step 1002) with, for example, D2D communication being activated and/or enabled within one or more mobile devices. The presence of the mobiles device(s) within a wireless network is detected (step 1004).

A D2D connectability score is then calculated for each of the detected mobile devices (step 1006). As described above, the calculating of the D2D connectability score for each of the plurality of mobile electronic devices may be based on a security posture of the respective mobile electronic device, a privacy posture of the respective mobile electronic device, or a combination thereof. The calculating of the D2D connectability score may (also) be based on a cost associated with utilizing the respective mobile electronic device in D2D communications. The calculating of the D2D connectability score may (also) be based on previously recorded data with respect to quality associated with the respective mobile electronic device, a determination of the software installed on the respective mobile electronic device, and/or predicted movements of the respective mobile electronic device.

A signal representative of the calculated D2D connectability score(s) is generated (step 1008). The signal may be transmitted at least one of to a base station within the wireless communication network or from a respective one of the plurality of mobile devices to another mobile electronic device.

Method 1000 ends (step 1010) with, for example, D2D communications being established between another mobile electronic device and a selected one of the plurality of mobile electronic devices based on the calculated D2D connectability score of each of the plurality of mobile electronic devices. After D2D communications have ended, method 1000 may again detect the presence of (new/additional) mobile electronic devices (step 1004) and/or (re)calculate the D2D connectability score(s) of the appropriate devices (step 1006) (i.e., the process may be continually performed to identify the "best" candidate devices for D2D communications).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing a wireless communication network comprising:
   detecting the presence of a plurality of mobile electronic devices within a wireless communication network;
   calculating a device-to-device (D2D) connectability score for each of the plurality of mobile electronic devices; wherein the calculating of the D2D connectability score for each of the plurality of mobile electronic devices is based on a security posture of the respective mobile electronic device, a privacy posture of the respective mobile electronic device, or a combination thereof; and
   generating a signal representative of the calculated D2D connectability score for each of the plurality of mobile electronic devices.

2. The method of claim 1, further comprising transmitting the signal at least one of to a base station within the wireless communication network or from a respective one of the plurality of mobile devices to another mobile electronic device.

3. The method of claim 1, further comprising establishing D2D communications between another mobile electronic device and a selected one of the plurality of mobile electronic devices based on the calculated D2D connectability score of each of the plurality of mobile electronic devices.

4. The method of claim 1, wherein the calculating of the D2D connectability score for each of the plurality of mobile electronic devices is based on a cost associated with utilizing the respective mobile electronic device in D2D communications.

5. The method of claim 1, wherein the calculating of the D2D connectability score for each of the plurality of mobile electronic devices is based on previously recorded data with respect to quality associated with the respective mobile electronic device.

6. The method of claim 1, wherein the calculating of the D2D connectability score for each of the plurality of mobile electronic devices is based on predicted movements of the respective mobile electronic device.

7. A system for managing a wireless communication network comprising:
   at least one processor that
      detects the presence of a plurality of mobile electronic devices within a wireless communication network;
      calculates a device-to-device (D2D) connectability score for each of the plurality of mobile electronic devices; wherein the calculating of the D2D connectability score for each of the plurality of mobile electronic devices is based on a security posture of the respective mobile electronic device, a privacy posture of the respective mobile electronic device, or a combination thereof; and generates a signal representative of the calculated D2D connectability score for each of the plurality of mobile electronic devices.

8. The system of claim 7, wherein the at least one processor further transmits the signal at least one of to a base station within the wireless communication network or from a respective one of the plurality of mobile devices to another mobile electronic device.

9. The system of claim 7, wherein the at least one processor further establishes D2D communications between another mobile electronic device and a selected one of the plurality of mobile electronic devices based on the calculated D2D connectability score of each of the plurality of mobile electronic devices.

10. The system of claim 7, wherein the calculating of the D2D connectability score for each of the plurality of mobile electronic devices is based on a cost associated with utilizing the respective mobile electronic device in D2D communications.

11. The system of claim 7, wherein the calculating of the D2D connectability score for each of the plurality of mobile electronic devices is based on previously recorded data with respect to quality associated with the respective mobile electronic device.

12. The system of claim 7, wherein the calculating of the D2D connectability score for each of the plurality of mobile electronic devices is based on predicted movements of the respective mobile electronic device.

13. A computer program product for managing a wireless communication network by one or more processors, the computer program product comprising a non-transitory computer-readable storage medium having computer-readable program code portions stored therein, the computer-readable program code portions comprising:

an executable portion that detects the presence of a plurality of mobile electronic devices within a wireless communication network;

an executable portion that calculates a device-to-device (D2D) connectability score for each of the plurality of mobile electronic devices; wherein the calculating of the D2D connectability score for each of the plurality of mobile electronic devices is based on a security posture of the respective mobile electronic device, a privacy posture of the respective mobile electronic device, or a combination thereof; and an executable portion that generates a signal representative of the calculated D2D connectability score for each of the plurality of mobile electronic devices.

14. The computer program product of claim 13, wherein the computer-readable program code portions further include an executable portion that transmits the signal at least one of to a base station within the wireless communication network or from a respective one of the plurality of mobile devices to another mobile electronic device.

15. The computer program product of claim 13, wherein the computer-readable program code portions further include an executable portion that establishes D2D communications between another mobile electronic device and a selected one of the plurality of mobile electronic devices based on the calculated D2D connectability score of each of the plurality of mobile electronic devices.

16. The computer program product of claim 13, wherein the calculating of the D2D connectability score for each of the plurality of mobile electronic devices is based on a cost associated with utilizing the respective mobile electronic device in D2D communications.

17. The computer program product of claim 13, wherein the calculating of the D2D connectability score for each of the plurality of mobile electronic devices is based on previously recorded data with respect to quality associated with the respective mobile electronic device.

18. The computer program product of claim 13, wherein the calculating of the D2D connectability score for each of the plurality of mobile electronic devices is based on predicted movements of the respective mobile electronic device.

* * * * *